United States Patent [19]

Miller

[11] 4,410,578

[45] Oct. 18, 1983

[54] RECEPTACLE FOR MOISTURE EXUDING FOOD PRODUCTS

[76] Inventor: Alan H. Miller, River Rd., Patterson, N.C. 28661

[21] Appl. No.: 347,627

[22] Filed: Feb. 10, 1982

Related U.S. Application Data

[60] Division of Ser. No. 258,616, Apr. 29, 1981, Pat. No. 4,321,997, which is a continuation-in-part of Ser. No. 96,797, Nov. 23, 1979, Pat. No. 4,275,811, which is a continuation-in-part of Ser. No. 69,074, Aug. 23, 1979, abandoned, which is a continuation of Ser. No. 885,622, Mar. 13, 1978, abandoned.

[51] Int. Cl.$^3$ .............................................. B32B 3/12
[52] U.S. Cl. ................................ 428/117; 206/204; 220/445; 426/124; 426/129; 428/255
[58] Field of Search ...................... 428/327, 117, 255; 220/445; 206/204; 426/124, 129

[56] References Cited

U.S. PATENT DOCUMENTS

| | | | |
|---|---|---|---|
| 3,026,209 | 3/1962 | Niblack et al. | 99/174 |
| 3,642,550 | 2/1972 | Doll | 156/78 |
| 3,936,553 | 2/1976 | Rowe | 428/81 |
| 4,055,180 | 10/1977 | Karami | 128/287 |

FOREIGN PATENT DOCUMENTS 1168925 10/1969 United Kingdom .

Primary Examiner—Marion McCamish
Assistant Examiner—P. R. Schwartz
Attorney, Agent, or Firm—Bell, Seltzer, Park & Gibson

[57] ABSTRACT

An absorbent pad is provided for use in a receptacle intended to contain and display food products which tend to exude juices or liquids. The absorbent pad comprises a mat of liquid absorbent material, an upper liquid impermeable plastic sheet overlying the absorbent mat, and a bottom plastic sheet underlying the absorbent mat. At least one of the sheets is perforated, and spacer means is disposed between the two sheets to maintain their separation under a compressive load, and such that the ability of the pad to absorb liquids is unimpaired when the pad is subjected to a compressive load resulting from the food product resting thereon or the like. Preferably only the bottom sheet is perforated, and when a food product is positioned upon the upper sheet of the absorbent pad, any exuded liquids will flow around the pad and enter the mat by capillary action through the perforated openings of the bottom sheet, and the liquids will be held out of contact with the food product to thereby minimize contamination of the product and maintain its appearance and improve its shelf-life.

7 Claims, 12 Drawing Figures

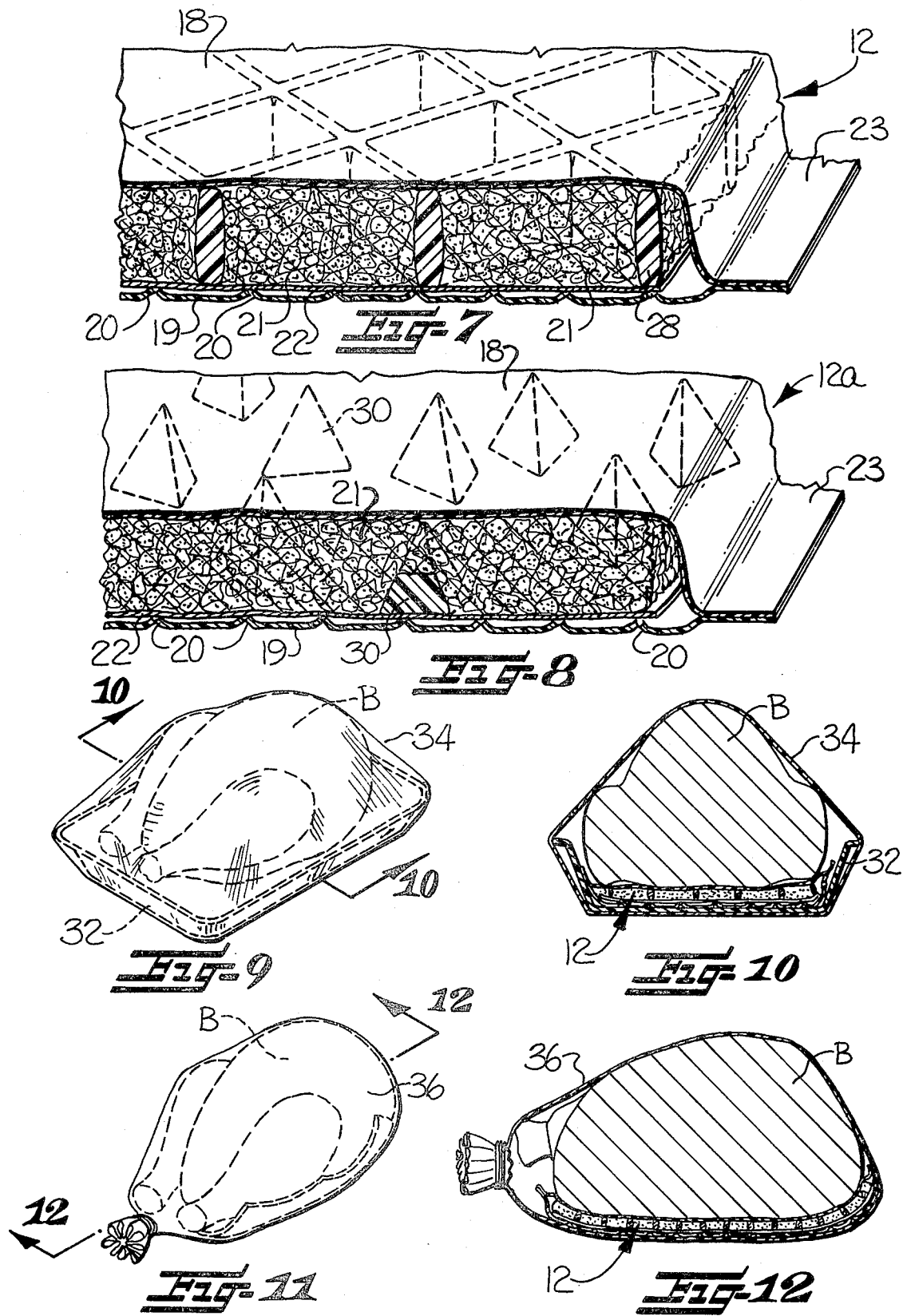

RECEPTACLE FOR MOISTURE EXUDING FOOD PRODUCTS

This application is a division, of application Ser. No. 258,616, filed Apr. 29, 1981, (now U.S. Patent No. 4,321,997) which in turn is a continuation-in-part of application Ser. No. 96,797, filed Nov. 23, 1979, (now U.S. Pat. No. 4,275,811), which in turn is a continuation-in-part of application Ser. No. 69,074, filed Aug. 23, 1979 (now abandoned), which in turn is a continuation of application Ser. No. 885,622, filed Mar. 13, 1978 now abandoned).

The present invention relates to an improved absorbent pad and receptacle of the type used to contain and display various food products, and which act to substantially improve the appearance and shelf-life of the product.

It is conventional practice to display meat, poultry, and other food products in individual packages which comprise a supporting tray with an absorbent pad of tissue-like paper wadding in the bottom of the tray to absorb any juices or liquids exuded from the food product. A transparent outer plastic wrapping is also usually employed to cover and surround the package. A major problem associated with such packages is the fact that the exuded liquids support the rapid growth of bacteria, which migrate back to the food product and result in spoilage and discoloration thereof. As will be apparent, such spoilage and discoloration quickly renders the food product unsuitable for sale.

In an effort to alleviate the above problem, and to extend the shelf-life of such food products, it has been proposed to employ an absorbent pad in the package which includes an imperforate plastic film positioned above a layer of absorptive wadding, and such that the plastic film acts to retard the reverse migration of the liquids back to the food product. Also, it has been proposed to position a non-absorptive barrier above the absorbent material for this purpose, note the U.S. Patent to Niblack et al, No. 3,026,209. While the above package constructions provide a spacial relationship between the exuded liquids in the pad and the food product, they nevertheless permit the substantial migration of bacteria back to the food product and thus are not totally satisfactory.

In applicant's prior applications as noted above, there is disclosed an absorbent pad adapted for use in food product receptacles of the described type, and which comprises a mat of liquid absorbent material, an upper liquid impermeable plastic sheet overlying the absorbent mat, and a perforated bottom plastic sheet underlying the absorbent mat. When a food product is positioned upon the upper sheet of the absorbent pad, any exuded liquids will flow around the pad and enter the mat by capillary action through the perforated openings of the bottom sheet, and the liquids will be held out of contact with the food product to thereby minimize contamination of the product and maintain its appearance and improve its shelf-life.

While the applicant's above described pad is seen to represent a significant advance in the art, and has met with substantial commercial success, it has been found that in the case of certain rather heavy food products, or where a number of packages are stacked upon each other, the mat of absorbent material is compressed over a significant portion of its area, and the ability of the mat to absorb liquids is thereby restricted. Thus the pad is unable to utilize its full absorbency potential.

It is accordingly an object of the present invention to provide an absorbent pad for use in a receptacle for displaying food products which substantially alleviates the problem of food spoilage and discoloration resulting from bacterial growth within the exuded liquids, and thus materially contributes to the shelf-life of the food product.

It is a more particular object of the present invention to provide a display receptacle of the described type and which has provision for isolating the exuded liquids from the food product to thereby substantially preclude the reverse migration of the bacteria back to the food product.

It is a further object of the present invention to substantially limit the compression of the pad when it is subjected to a compressive load, to thereby minimize the reduction in the ability of the pad to absorb liquids when it is subjected to such load. Stated in other words, it is an object of the present invention to provide a pad which has the ability to hold and retain a substantial quantity of liquid even when subjected to a substantial compressive load resulting from the food product or other packages stacked thereupon.

Additional objects of the present invention are to provide a display receptacle which is aesthetically pleasing, which does not significantly "rob" the food product of its moisture or natural liquids, and which permits the use of chemical additives in the absorptive material while preventing the additives from contacting the food product.

These and other objects and advantages of the present invention are achieved in the embodiments illustrated herein by the provision of an absorbent pad which comprises a mat of liquid absorbent material, an imperforate, liquid impermeable upper sheet overlying and covering the mat of absorbent material, and a bottom sheet of liquid impermeable material underlying the mat. The peripheral edges of the upper and bottom sheets are sealed together to enclose the mat of absorbent material therebetween, and the bottom sheet includes a plurality of openings which permit passage of a liquid into the absorbent material. Further, spacer means is disposed between the two sheets for maintaining the separation of the sheets under the compressive load exerted by a food product or the like resting thereupon. Thus the compression of the mat is minimized, as is the reduction in the ability of the mat to absorb and retain liquids when subjected to such load.

In one embodiment, the pad is disposed upon the bottom wall of a supporting tray, with the bottom sheet of the pad being disposed adjacent the tray bottom wall and so that the food product rests upon the upper imperforate sheet of the pad. The liquids exuded from the food product thus pass around the edges of the pad and onto the bottom wall of the tray, and are drawn upwardly into the mat through the openings in the bottom sheet by capillary action. Once in the mat, the liquids are confined against reverse flow by the capillary action, and the imperforate upper sheet acts to prevent migration of bacteria, which may develop in the liquids, back to the food product. In another embodiment, the pad is disposed within a flexible transparent plastic bag, with the apertured bottom sheet of the pad being disposed against the wall of the bag, and so that a food product may be retained in the bag in contact with the upper sheet of the pad and the exuded liquids collected and confined in the pad in the above-described manner.

The liquid absorbent material of the pad is preferably composed of superposed layers of paper wadding and wood fluff, and with the layer of paper wadding being disposed immediately adjacent the apertured bottom sheet and so as to prevent dust from the wood fluff from passing outwardly through the openings.

Some of the objects having been stated, other objects will apear as the description proceeds, when taken in connection with the accompanying drawings in which:

FIG. 7 is an enlarged, fragmentary sectional perspective view of the pad shown in FIGS. 3-6;

FIG. 8 is a view similar to FIG. 7, but illustrating a second embodiment of the pad;

FIG. 9 is a perspective view of the pad shown in FIGS. 3-7, together with a tray and the packaged food product;

FIG. 10 is a sectional view taken substantially along the line 10—10 of FIG. 9;

FIG. 11 is a perspective view which illustrates the pad disposed within a flexible transparent plastic bag, and further illustrating the packaged food product; and FIG. 12 is a sectional view taken substantially along the line 12—12 of FIG. 11.

Figure 1:
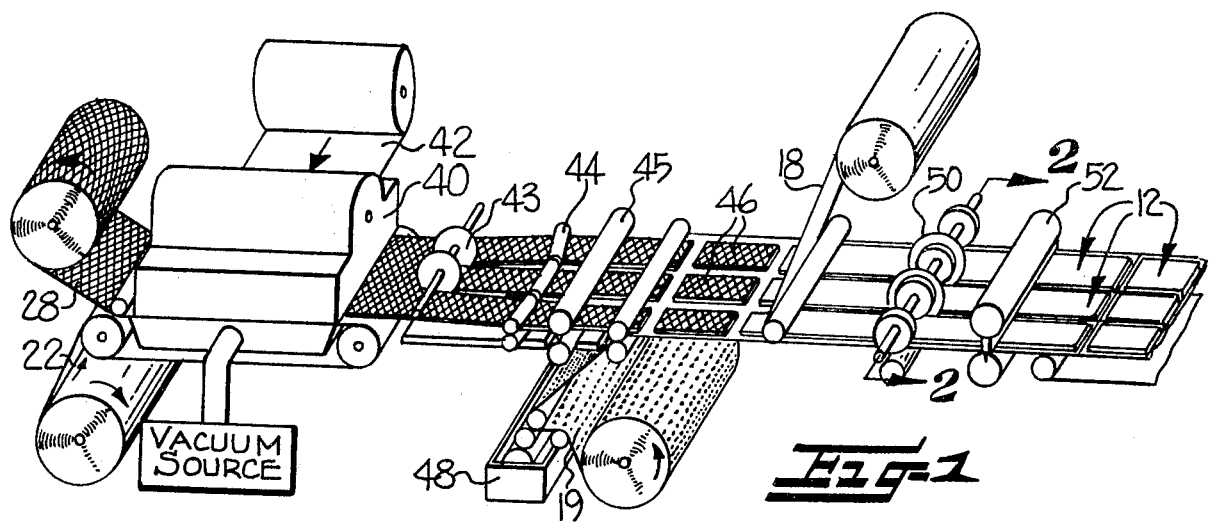
FIG. 1 is a schematic diagram of an apparatus and method for commercially fabricating an absorbent pad embodying the features of the present invention.

Referring more specifically to the drawings, FIGS. 3-7 disclose an absorbent pad 12 which embodies the present invention. The pad 12 is rectangular in outline, and comprises a mat 16 of liquid absorbent material, an upper sheet 18 of substantially liquid impermeable hydrophobic material overlying and covering the mat of absorbent material, and a bottom sheet 19 of hydrophobic material underlying the mat of absorbent material. The bottom sheet is apertured by a plurality of minute openings 20 which are substantially uniformly distributed over its full area.

The thickness of the mat 16 may be varied to control the absorbency thereof, and typically is between about ⅛ to ¼ inches so as to permit absorption and retention of a substantial quantity of liquid. The mat may be composed of a number of absorbent materials, such as conventional defiberized wood pulp (known in the art as wood fluff), synthetic pulp such as rayon, cotton, or combinations of the above.

In a preferred embodiment as illustrated herein, the mat 16 is composed of hydrophilic cellulose base fibers, and more particularly, the mat is composed of a relatively thick layer of wood fluff 21, and a relatively thin layer of tissue-like paper wadding 22. Wood fluff is well known in the art and consists of defiberized cellulose fibers which have been formed into a compressed batt in the manner of a non-woven fabric, and as further described below. The paper wadding 22, which is also known in the art, is produced on a Fourdrinier paper making machine, and may, if desired, be creped for added body. The wadding typically has a texture similar to household facial tissue, and has substantially more integrity than does the wood fluff. As best seen in FIG. 7, the wadding layer 22 is preferably disposed immediately adjacent the perforated bottom sheet 19 as hereinafter further described, and in this orientation, it has been found that the wadding layer also acts to prevent any loose fluff dust from passing through the openings and possibly contaminating the food product.

Various additives may be added to the mat to increase its liquid absorbency. A particular example of a suitable additive of this type is a synthesized starch, such as the starch-acrylonitrile graft co-polymer as described in U.S. Pat. No. 3,771,815. This product is marketed commercially as a free flowing powder, which may be either sifted onto the fluff layer or sifted into the fluff chamber when the layer is being formed. In addition, a bactericidal agent, such as potassium sorbate, mayb be added to the mat to retard bacterial growth.

The upper and lower sheets 18 and 19 are typically of like composition and are composed of a material which is non-reactive to food products. For example, the sheets may comprise a flexible thermoplastic film, such as polyethylene having a thickness between about 0.00035 to 0.005 inches. The peripheral edges of the upper and bottom sheets extend beyond the mat 16 and are preferably sealably secured together as shown at 23 by any suitable means, such as a hot melt adhesive seal, or by heat sealing, to thereby sealably enclose the mat of absorbent material therebetween. In addition, the openings 20 in the bottom sheet permit the passage of a liquid from the bottom wall of a supporting tray or the like into the absorbent material. The openings 20 typically have a density of between about 80 to 90 per square inch, and in this regard, the openings 20 may be formed by a perforating operation, such as by contacting the film with a roll covered with pins having a diameter of about 0.01 inches, and of the type used on a textile carding cloth. Such perforating operation results in the openings having a diameter of about 0.01 inches, and peripheral portions 25 (note FIG. 6) which extend outwardly from the sheet. Also, the sheet 19 is oriented so that the peripheral portions 25 extend toward the mat 16 and thereby act to further retard the passage of a liquid outwardly from the mat and through the sheet.

The pad 12 of the present invention further includes spacer means disposed between the upper and bottom sheets for maintaining the separation thereof under the compressive load exerted by a food product or the like resting upon the pad. The spacer means serves to minimize the compression of the mat, and thus the reduction in the ability of the mat to absorb liquids when subjected to such load.

In the embodiment of FIGS. 3-7, the spacer means comprises a sheet 28 of net-like thermoplastic foam material, of the type further described in the U.S. Pat. to Doll, No. 3,642,550. The sheet 28 rests upon the paper wadding layer 22, and the material of the sheet 28 will be seen to directly overlie and cover a relatively small portion of the total area of the wadding, for example, less than about one quarter of such area, note FIG. 7. Also, the wood fluff 21 is disposed within the interstices of the net-like sheet 28, so as to be substantially co-planar therewith.

In the embodiment of FIG. 8, the pad 12a includes spacer means which comprise a plurality of discrete elements 30 of plastic material. As illustrated, these discrete elements 30 comprise four sided pyramidal blocks of plastic foam material, and it will be understood that a variety of other shapes, such as cubes or spheres, could similarly be employed and would serve to maintain the separation of the sheets 18 and 19 under a compressive load.

As seen in FIGS. 9 and 10, the pad 12 of the present invention may be employed in association with a support tray 32 having a generally rectangular bottom wall and an upstanding peripheral side wall. The pad 12 is sized to overlie substantially the full area of the bottom wall of the tray 32, and in use, the pad is positioned upon the bottom wall with the apertured bottom sheet 19 contacting the bottom wall of the tray. The food product B is positioned to rest upon the upper sheet 18 of the pad, and an outer wrapping 34 of suitable thermoplastic film material may then be positioned over the food product and heat sealed beneath the tray in the conventional manner, to form the completed food package.

In use, the juices or liquids from the food product resting on the pad 12 will tend to flow downwardly onto the bottom wall of the tray 32 and beneath the pad. The capillary action of the absorbent material in the mat 16 tends to lift these liquids into the pad where they are held out of contact with the food product. The upper sheet 18 prevents these absorbed liquids and any additives in the mat from directly contacting the food product, and the combination of the capillary action and the small size and construction of the openings 20 act to retard the reverse flow of the liquids through the openings. Thus substantially all migration of the exuded liquids back to the food product is precluded, thereby significantly alleviating the problems of spoilage and discoloration. Further, the upper surface of the sheet 18 remains relatively clean and smooth in use thereby resulting in an aesthetically pleasing appearance, and the spacer means serves to prevent the food product from compressing the wood fluff 20 so that the capacity of the mat to absorb liquids is substantially unimpaired.

FIGS. 11 and 12 illustrate a further embodiment of the present invention wherein the pad 12 as described above is disposed within a transparent flexible plastic bag 36 having a closeable end opening. The pad is disposed with the apertured bottom sheet 19 in contact with the wall of the bag, and the food product B is preferably oriented so as to overlie the pad and rest upon the upper sheet 18. Thus the exuded liquids will flow downwardly and beneath the pad in the manner described above, where they are drawn into the mat and thus confined out of contact with the food product.

Figure 2:
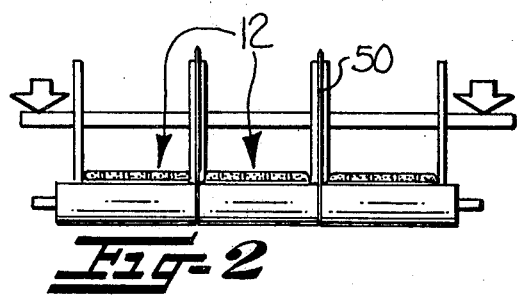
FIG. 2 is a sectional elevation view taken substantially along the line 2—2 of FIG. 1.
Figure 4:
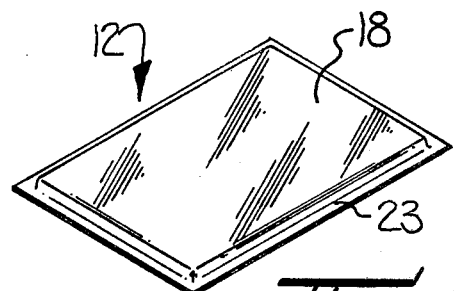
FIG. 4 is a perspective view of the pad shown in FIG. 3.
Figure 3:
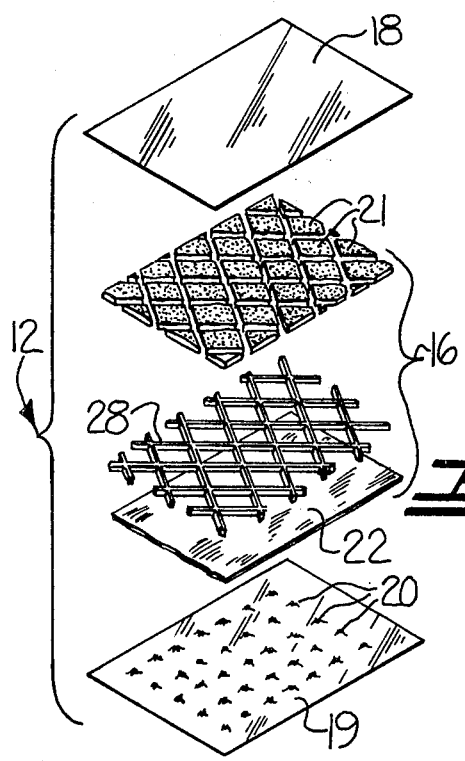
FIG. 3 is an exploded perspective view of an absorbent pad embodying the features of the present invention.
Figure 5:
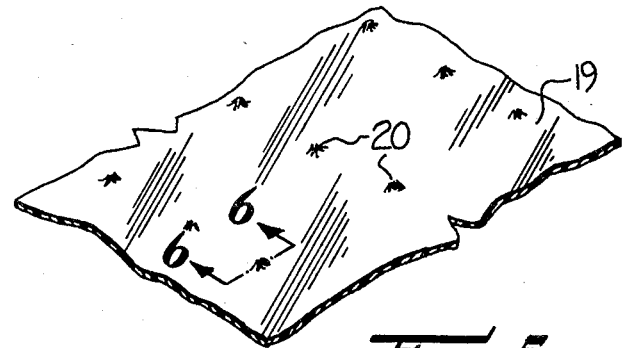
FIG. 5 is an enlarged, fragmentary perspective view of the bottom sheet of the pad.
Figure 6:
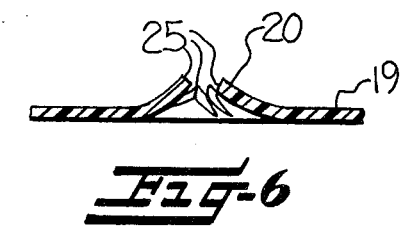
FIG. 6 is an enlarged, fragmentary sectional elevation view showing one of the openings in the bottom sheet and taken substantially along the line 6—6 of FIG. 5.

FIGS. 1 and 2 schematically illustrates an apparatus and method for fabricating the pad 12 of FIGS. 3–7. As illustrated, a sheet of paper wadding 22 and an overlying sheet of expanded net-like plastic foam material 28 are advanced into and through a shredding apparatus 40. Concurrently, a roll of suitable absorbent material 42 is advanced into the shredding apparatus, which reduces such absorbent material into a defiberized mass, which is then deposited with the aid of a vacuum onto the advancing sheet of wadding 22 so as to fill the interstices formed by the net-like foam sheet and form the layer of wood fluff 21. The overlying materials are then slit at 43 into longitudinal strips, which are laterally separated by rolls 44. The strips are then cut transversely at 45 to form separate pad components 46.

A roll of perforated plastic sheet material 19 is fed through an adhesive applicator 48 and then to a position to underlie the pad components 46. The adhesive is preferably applied in a pattern which match the land areas between the pad components, and a second plastic sheet 18 is brought onto the advancing pad components so that the adhesive seals the two sheets together in the land areas. The components then pass through a slitter 50, and then cut into proper lengths to 52 result in the finished product 12.

In the case of the pad 12a shown in FIG. 8, a suitable apparatus is provided for randomly depositing the discrete elements 30 onto the sheet of paper wadding 22 prior to its advance into the shredding apparatus 40, and the net-like material 28 is omitted. Otherwise, the process for producing the pad 12a of FIG. 8 is comparable to that illustrated in FIG. 1.

In the drawings and specification, there has been set forth a preferred embodiment of the invention, and although specific terms are employed, they are used in a generic and descriptive sense only and not for purposes of limitation.

That which is claimed is:

1. An absorbent pad useful in a food package to separate and maintain the exuded liquids from the food product to thereby minimize contamination of the food product, and comprising:
    a mat of liquid absorbent material,
    a first sheet of plastic material overlying and covering one side of said mat of liquid absorbent material, and
    a second sheet of plastic material overlying and covering the other side of said mat of liquid absorbent material, the peripheral edges of said first and second sheets being sealed together to enclose said mat therebetween, and at least one of said sheets having a plurality of openings which permit the passage of a liquid into said mat, and
spacer means dispersed substantially within said mat of liquid absorbent material extending substantially the entire distance between said first and second sheets for maintaining the separation of said sheets under the compressive load exerted by a food product or the like resting thereupon, and to thereby minimize the compression of the mat and the reduction in the ability of the mat to absorb liquids when subjected to such load.

2. The absorbent pad as defined in claim 1 wherein said spacer means comprises a sheet of net-like thermoplastic foam material.

3. The absorbent pad as defined in claim 1 wherein said spacer means comprises a plurality of discrete elements of plastic material.

4. The absorbent pad as defined in claim 3 wherein said discrete elements are randomly distributed.

5. The absorbent pad as defined in any one of claims 1–4 wherein said mat of liquid absorbent material includes a layer of paper wadding, and wood fluff overlying one side of said paper wadding.

6. The absorbent pad as defined in claim 5 wherein said spacer means is disposed to rest upon and cover a relatively small portion of the area of said one side of said paper wadding, with said wood fluff disposed to cover the remaining area of said one side of said paper wadding.

7. The absorbent pad as defined in claim 5 wherein said first sheet is liquid impermeable, said openings are substantially uniformly distributed over the full area of said second sheet only, and said layer of paper wadding is disposed immediately adjacent said second sheet.

* * * * *